3,153,318
EXHAUST SYSTEMS FOR GAS PRODUCING UNITS
Donald Wilfred Tryhorn, Chalfont St. Peters, and James
  John Stewart Smith, Maidenhead, England, assignors
  to Sir W. G. Armstrong Whitworth and Company
  (Engineers) Limited, Slough, England
Filed Aug. 15, 1962, Ser. No. 217,224
3 Claims. (Cl. 60—13)

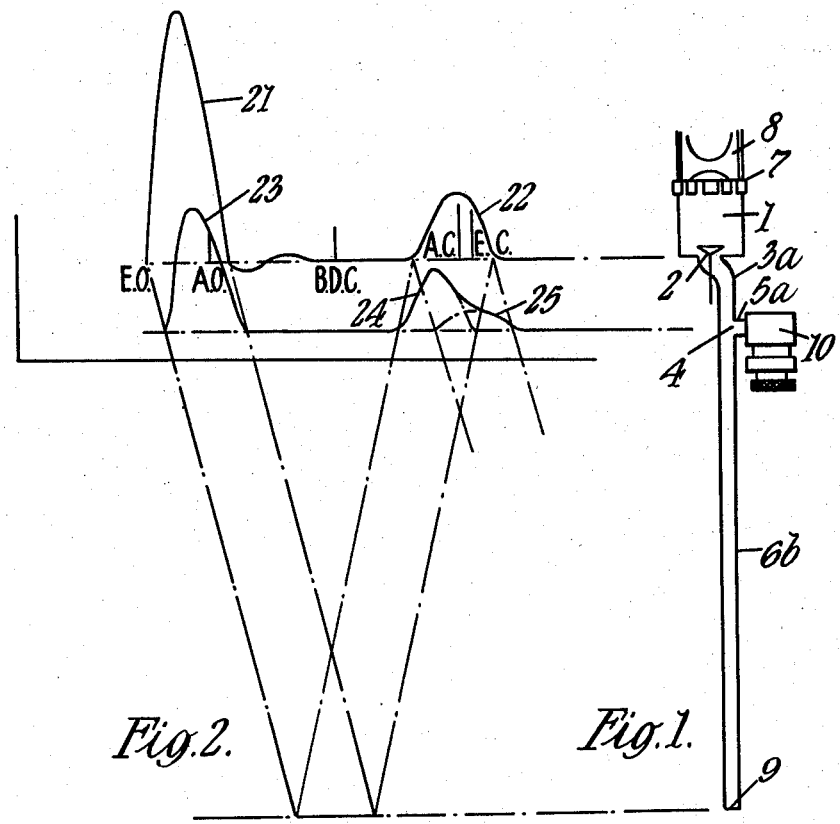
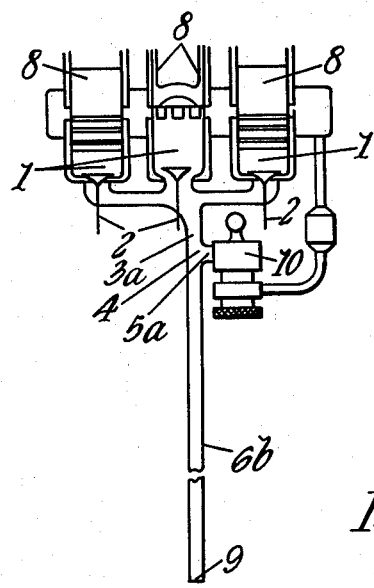
Fig.2. Fig.1. Fig.3.

The invention relates to a gas producing unit of the type in which combustion takes place in an enclosed space and the gaseous products of combustion are periodically discharged at high temperature and under pulsating pressures to drive a turbine or other machine operated by the expansion of the said gaseous products. Included in such types of units are two-stroke cycle internal combustion engines provided with an exhaust gas driven turbo-charger, and gas generators of the free piston or crankshaft type. More particularly, the invention relates to improvements in the exhaust systems of such units.

The conditions of the gas supplied to a turbine affect its efficiency of operation, because it is designed to work with an expansion ratio which is substantially constant. Thus the potential energy in a pulsating gas flow can be converted into mechanical energy in the turbine shaft, with only relatively low efficiency. Nevertheless, for a given gas supply and suitable turbine, it is possible for a pulsating gas flow in a known exhaust system, comprising a short duct between the point of gas supply and the turbine, to be more efficient than a substantially constant gas flow in another known exhaust system comprising an expansion chamber between the same two points, but the reason is that the high utilisable energy, and low turbine efficiency, of the former case, are more effective than the lower utilisable energy and relatively higher turbine efficiency of the latter case. The inefficiency of a turbo-charger system at any unit or engine performance rating is shown by the turbine inlet temperature which is required to make it operate satisfactorily. The lower the efficiency, the higher the exhaust temperature must be for satisfactory operation, and therefore the nearer the engine is to its maximum performance rating. In other words, improved methods of operation which enable a given performance rating to be obtained with a lower exhaust temperature are very advantageous, and permit an increase in the performance rating of the engine.

The efficiency of a turbine increases when, for the delivery of the same total energy, the frequency of the pulsations increases and the pressure of their peaks decreases, relative to the frequency and pressure of the initial pulses from the gas producing unit. An object of the invention is to harness a high proportion of the energy of the pulsating gas flow and to deliver the gases to the turbine at more nearly constant pressure.

Thus, in accordance with the invention, it is arranged that each pulse of exhaust gases entering the system is divided into portions, with a minimum loss of total energy, and the different portions of the pulse are caused to travel different distances so that they reach the turbine at different times in the gaseous cycle of the unit.

In two stroke cycle units the enclosed space or cylinder in which combustion takes place, requires to be scavenged and provided with fresh charge during each cycle of operation. With a known short exhaust duct system, the initial pressure pulse fills the duct for a large portion of the scavenging and charging period, thus leaving only a short time for the latter actions and therefore a high pressure difference between the scavenging medium and the exhaust gases is required. With an expansion chamber incorporated in the exhaust duct of another known system the scavenge pressure is low but the utilisable energy of the turbine is also low. With both these known exhaust systems it is only when the engine load is high and the temperature and pressure of the exhaust gases are high, that the turbine is capable of converting the energy in the exhaust gases into mechanical energy with an efficiency high enough to provide sufficient power to enable the compressors to supply the necessary quantity and pressure of the scavenging and charging medium. At all lower loads the attainment of the desired conditions requires the assistance of an engine driven or separately driven compressor.

It is desirable that the scavenging and charging should be carried out with a minimum expenditure of energy and therefore it is advantageous to arrange in accordance with the invention for a low pressure to be present in the exhaust system adjacent the exhaust outlet from the cylinder during the scavenging and charging period. In this way, the necessary pressure difference between the scavenging medium and the exhaust gases can be obtained with a low pressure of the former. It will be appreciated that direct employement of the exhaust energy, to give the desired low pressure in the cylinder and duct, by means of waves of rarefaction, ensures that the energy is applied over a short interval of time, and thus it is more effective than passing a slightly higher pressure pulse to the turbine, and the turbine and compressor converting this energy into a slightly higher scavenge pressure, which would be spread over a long interval of time.

As already described it is necessary at this time to have a relatively high pressure of exhaust gases in the said exhaust system adjacent to the turbine, to drive the latter. Preferably the pressure in the exhaust system adjacent the exhaust outlet from the cylinder should increase towards the end of the charging period, to reduce the quantity of charge escaping to the exhaust system, and to raise the pressure within the cylinder.

For example, in a two-stroke cycle internal combustion engine, in which the inlet and exhaust orifices are open for a large portion of the scavenging and charging period, and in which a turbine, driven by the exhaust gases from the engine, provides the scavenging, charging and supercharging medium, an exhaust system arranged in accordance with the invention enables an engine to give a high output, with low exhaust temperature and fuel consumption, and enables the said medium to be provided in the required quantities and pressures to suit all loads and speeds of the engine. Thus an additional engine driven or separately driven compressor is not essential, but one may be used to assist starting or where very high engine acceleration is required, and in such cases the advantages of the system described are not lost, since the power required to drive said additional compressor is much less than with the known systems.

The invention consists in a gas producing unit comprising at least one combustion chamber having controlled exhaust orifices that open and close in sequence at predetermined points in the cycle of operations of the said unit and from which the gaseous products of combustion are discharged periodically at high temperature and under pressure, thus producing successive pulses of gases, a driven machine positioned close to the said exhaust orifices, and an exhaust system, including a junction, a first duct made to the practical limit of shortness leading from said exhaust orifices to said junction, where each pulse of gases originating at said exhaust exhaust orifices is divided into primary and secondary partial pulses, a second duct made to the practical limit of shortness leading from said junction to said driven machine, through which the primary partial pulses pass directly to the machine and by their expansion drive the machine, and at least one wave pipe, that is closed at the end remote from said junction and is connected to said junction to provide passage means for said secondary partial pulses, and the passage way for said secondary partial pulses is so much longer than the direct passage for said primary partial pulses that each said secondary partial pulse reaches said machine to aid in its operation after each associated primary partial pulse of gases, which travelled directly along said second duct, has substantially completed the expansion of its gases in driving the machine.

The invention further consists in an exhaust system for a gas producing unit of the type comprising a plurality of combustion chambers, each having controlled exhaust orifices that open and close in sequence at predetermined points in the cycle of operation of the said unit, and from which the gaseous products of combustion are discharged periodically at high temperature and under pressure, thus producing successive pulses of gases, a driven machine positioned close to the said exhaust orifices, and an exhaust system, including a junction, a first duct made to the practical limit of shortness for connecting said junction the said exhaust orifices of the number of combustion chambers in which the periods that the exhaust orifices are open do not overlap substantially, and at said junction each said pulse of gases originating at said exhaust orifices is divided into primary and secondary partial pulses, a second duct made to the practical limit of shortness leading from said junction to said machine, through which the primary partial pulses pass directly to the machine, and by their expansion drive the machine, and one wave pipe, that is closed at the end remote from the junction and is connected to said junction to provide passage means for the said secondary partial pulses originating at all of the plurality of combustion chambers, and the passage way for said secondary partial pulses is so much longer than the direct passage way for said primary partial pulses along said second duct, that the machine is supplied with substantially separate primary and secondary partial pulses, and the frequency of the partial pulses is at least double the frequency of the pulses originating at the said exhaust orifices of the said combustion chambers, and their amplitude is reduced.

The length of the wave pipe may be made such that the portion of the partial pulse reflected from the closed end of the wave pipe, which passes the entry to the said duct and proceeds back to the exhaust orifices of the combustion chamber, reaches the latter towards the end of its charging period.

To obtain the desired effects, the increases or decreases in the cross sectional area of the exhaust system, which cause positive or negative reflections of the gaseous pressure pulses, must be restricted by careful design of sizes and lengths, to those which are necessary to give the required pressure distribution throughout the exhaust system for the complete scavenging and charging period. In a normal exhaust system, reflections which are not advantageous to the gaseous cycle frequently occur at junctions of pipes of different cross-sectional area, or where pipes join or leave a manifold, such junctions and manifold being arranged to give a simple and conventional exhaust system, without proper regard to their effect upon the pulses of pressure traversing the ducts.

The portion of the pulse in the wave pipe is reflected at the closed end of said pipe without change of sign, so that a positive pulse travels back along the wave pipe to the junction, where it is divided, and a portion travels along the second duct to drive the turbine while another portion travels back to the cylinder and raises the pressure therein towards the end of the charging period.

The accompanying drawings show, by way of example only, embodiments of the invention in which:

FIGURE 1 is a diagrammatic representation of a simple exhaust system in accordance with the invention as applied to a single cylinder two-stroke cycle engine;

FIGURE 2 indicates the pressure variations close to the exhaust orifice and to the turbine in the exhaust system of FIGURE 1; while FIGURE 3 is a diagrammatic representation of the exhaust system of FIGURE 1 applied to a multi-cylinder two-stroke cycle engine.

The general arrangement of the supercharged two-stroke cycle internal combustion engine may be substantially in accordance with any known type, in which the fresh charge is provided by a compressor driven by an exhaust gas turbine, which may also be of any known types. The normal arrangements for conveying the fresh charge from the compressor to the cylinders may be employed. The total quantity of fresh charge entering each cylinder should be sufficient to scavenge, charge, and supercharge the cylinder to the required pressure, and to provide the excess quantity which passes to the exhaust system and remains therein at the end of the charging period, thus taking no part in the ensuing combustion process.

Exhaust systems will now be described with reference to diagrammatic arrangements of the exhaust system and to pressure time diagrams showing the sequence of the variation in pressure of the exhaust orifice and to the machine, throughout the exhaust, scavenging and charging periods. Only the major fluctuations in pressure are shown, since it is these which differentiate the processes in the various exhaust systems.

In the figures illustrating this invention, the pressure diagrams are drawn in line with the position at which the pressure records have been taken, so that the change of cross-sectional area from which reflection has taken place can be identified. Within the limits of the diagrammatic representations, they are distance/time diagrams and the slope of the lines joining equivalent occurrences, are a measure of the velocity at which the pulse or wave moved along the duct. The size of the initial pulse will vary with the type and output of the engine, and the relative size of the reflected pulses will vary with the form of the exhaust system. It is well understood that the length of the pressure pulse hereinafter mentioned relates to the length of duct of the chosen cross-sectional area which will contain the gases forming the pulse, and the method of calculating this length is well known. A check on the length of the pulse is readily made on an operating engine, and the behaviour of pressure pulses, sometimes called positive waves, and of waves of rarefaction, sometimes called negative waves, under the conditions described, is well understood by those skilled in the art. To enable the different embodiments of the invention to be readily understood, the figures have been selected to show simply and clearly the sequence of events, and therefore they are to a certain extent indicative and diagrammatic.

The abbreviations employed have the following meanings: EO=exhaust opening, AO=admission opening, AC=admission closing, EC=exhaust closing and BDC=bottom dead centre, i.e. when the piston is at its furthest away point from the combustion chamber.

A simple form of the wave pipe type of exhaust system, in accordance with the invention, is that required for a single cylinder engine, as shown in FIGURE 1. Assume the engine to be towards the end of its power stroke, so that the cylinder 1 is full of high temperature high pressure gases. When the exhaust orifice 2 is opened, the gaseous contents of the cylinder 1 will form a pressure pulse which moves away from the orifice along the short first duct 3a. When the pulse reaches the junction 4, it divides with consequent reduction in magnitude in relation to the cross-sectional areas now occupied and one part of it continues along the second short duct 5a to the machine 10, and another part of it enters the wave pipe 6b.

The wave pipe 6b is closed at its end 9, so that the pressure pulse therein is reflected without change of sign and returns to the junction 4 where part of it passes along short second duct 5a to the machine 10 and part of it returns along short first duct 3a to the cylinder. By reason of the greater distance travelled, the pulse passing along wave pipe 6b reaches the machine 10 later than the pulse travelling directly along second duct 5a and as a separate pulse of reduced amplitude. The length of the wave pipe is chosen such that the scavenging of the cylinder has been substantially completed before the return pulse from the closed end 9 of the wave pipe 6b reaches the exhaust orifice.

It is a further advantage of the wave pipe type of exhaust system that the length thereof can be arranged so that a pressure pulse arrives back at the exhaust orifice shortly before the admission ports are closed, and if the exhaust orifice is closed after the admission ports but before the pressure pulse reflected from within the cylinder can escape, at least part of the pressure pulse can be trapped within the cylinder, so that the pressure of the fresh charge is increased. This latter feature may not be essential to obtain a high engine output, since with the exhaust system of the invention, high efficiency, high pressure turbo-chargers can give sufficiently large quantities of fresh charge at a pressure high enough to ensure that the quantity retained in the cylinder exceeds the minimum necessary for good combustion. Moreover, when a high charging pressure is available these reflected pulses may add little to the total charge. FIGURE 2 shows the pressure variations close to the exhaust orifice of the system shown in FIGURE 1 for a single cylinder substantially constant speed engine. 21 is the initial exhaust pressure pulse leaving the exhaust orifice 2 and 22 is a portion of the reflected pulse from the closed end 9 of wave pipe 6b. The pressure diagram at the turbine is also shown in FIGURE 2, in which 23 indicates the arrival of a portion of the initial pulse 21 at the turbine, 24 indicates a portion of the reflected pulse from the closed end of the wave pipe 6b, and 25 indicates a portion of the reflected pulse from the cylinder when the exhaust orifice is nearly or fully closed. The time of arrival of wave 22 at the cylinder depends principally upon the length of pipe 6b. The short branch duct 5a forms an opening and the machine a partial opening in the side of the duct 3a, which allow expansion, and nullify the pressure pulse which would otherwise be reflected back to the cylinder from the turbine. In this example the length of the first duct 3a from the exhaust orifice 2 to the junction 4 of the second duct 5a leading from the junction 4 to the machine 10 are made to the practical limit of shortness. If a pressure pulse at the exhaust orifice as it closes is not desired, the pipe 6b must be made longer. The cross-sectional areas of all the ducts and pipes may be made approximately equal to the area of the exhaust orifices, but in some systems different areas may give a further improvement. Provided the required conditions can be obtained, small cross-sectional areas and lengths will conserve the energy of the pulses by permitting less expansion than large areas and lengths, so that more energy will be delivered to and reflected from the machine.

The wave pipe type exhaust system of the invention obtains a combination of the high utilisable energy at the turbine of the first mentioned known system, with the good scavenging conditions of the second mentioned known system, which leads to greatly improved overall performance of the engine.

The above descriptions relate to a single cylinder constant speed engine, and the additional requirements for multi-cylinder and variable speed engine will now be described.

In systems in which numerous occurrences take place in rapid succession, and in which compromises have to be made, it is not uncommon for preliminary calculations to be employed to give the approximate dimensions of various parts, and to ensure a practical result, and for the optimum performance to be obtained by the adjustments based on the results obtained.

Now that the requirements have been clearly stated, the preliminary calculations and compromises necessary in the present case will be readily appreciated by those skilled in the art, and also the adjustments necessary to obtain optimum results.

It is well understood that actions, such as valve openings and closings, whose period of operation are controlled by the mechanical cycle of an engine, take place in shorter times in high speed engines than in low speed engines, while the gaseous actions in the exhaust system, such as the movement of waves, takes place in substantially constant time and depend mainly on the temperature and pressure of the gases. The necessity of making allowances for these occurrences is fully appreciated in connection with engines that are required to operate over a wide speed range.

It will thus be understood that a slow speed engine, which is usually a large engine, will require longer wave pipes in an exhaust system according to the invention, than a high speed engine, which is usually a small engine. The rate of opening of the exhaust orifices, in conjunction with the area of the orifices, will control the length of the pressure pulse for any given condition of the gases in the cylinder.

In constant speed engines a close approximation to the ideal lengths of wave pipes can be achieved, as described earlier, but further compromises are necessary for engines operating over a speed range.

If pressure curves of the type described earlier are plotted on a base of time and the opening of the exhaust orifice is taken as the fixed point, then the marks representing the opening and closing of the admission port and the closing of the exhaust port will all move (diagrammatically) closer to the fixed points as the engine speed being considered is increased, and further away from the fixed points as the engine speed is decreased.

If the pressure curves are plotted on a base of crankshaft degrees of rotation, and the orifice opening and closing points are considered fixed, then the various pressure pulses and negative waves will be spread out over the diagram as the speed considered is increased and contracted as the speed is decreased.

Considerations apply to the arrangement of the lengths of the wave pipe in order that the reflected pressure waves do not reach the cylinder too early in the charging period, or alternatively after the exhaust orifice is closed, if the assistance of back charging is desired.

Thus the length of the wave pipe will vary with the speed range of the engine, the selected timing and areas of the inlet and exhaust orifices of the engine, the type of machine employed, the maximum temperature and pressure permissible within the cylinder, and the maximum output required.

There are a variety of exhaust pipe systems which can be designed to employ the wave pipe principle of this invention and when these are permutated with the possible different numbers of engine cylinders, the numbers of machine entries, and machines, it is impossible to give examples of all of them. The lengths of the various ducts and pipes, and the grouping of the exhausts from various cylinders, should be such that major pulses from one cylinder do not detrimentally affect the scavenging and charging of any interconnected cylinder.

A popular arrangement of a two-stroke cycle engine has three cylinders in line, and operates over a wide speed range. As shown in FIGURE 3 the three individual first ducts 3a from the exhaust orifices 2 of the three cylinders which are as short as practical may be connected together and to a single junction 4, with a second duct 5b also as short as possible from the junction 4 to the machine 10, and therefore said cylinder is exhausted precisely as described in connection with the single cylinder engine of FIGURES 1 and 2 while the wave pipe is connected to all the cylinders.

A six cylinder engine may be treated as two three cylinder engines, in which the six cylinders are collected together in two groups of three cylinders, in accordance with the previously described embodiment.

The application of the invention to gas generators of the free piston or crankshaft type need not be described separately, except to state that the exhaust system of the invention is placed between the combustion cylinders and the power machine. The cycles of events in such gas generators are very similar to those in a two-stroke cycle engine, and the invention does not relate to the mechanical arrangements of the various gas producing units. The cyclic operation of the pistons and the gaseous occurrences in the exhaust system are similar in all the types mentioned, and the cyclic frequencies can also be similar. Thus the design considerations described earlier are applicable to gas generators of the free piston and crankshaft types.

Only the behaviour of the major pulses has been described in detail in the above, and it will be appreciated that minor pulses must be present, including reflections of pulses that have passed through the cylinder and been reflected from the inlet orifices and piston or cylinder head. Again practical engine tests show that such occurrences do not detract appreciably from the improved efficiency of the engine, provided care is taken to ensure that such minor pulses are as small as possible if their effect is detrimental, or that they occur at points in the cycle where their effect is helpful.

In the case of engines having exhaust ports in the cylinder walls, or more than one exhaust valve in the cylinder head, more than one exhaust system per cylinder may be employed. Such exhaust systems may have different lengths, or be joined together at points which ensure that the delivery of pressure gases to the machine is spread over a still longer period, while the waves reflected back to the exhaust orifices may be spread over larger portions of the charging period.

As a result of extensive engine testing, the applicants have found that when employing an exhaust system in accordance with the invention, exhaust gas-driven turbocharger may be used as the only source of fresh charge. Moreover, the overall efficiency of the complete unit is such that at the reasonable turbine inlet temperature of 500 to 600° C., the turbocharger can, with increases above a certain load, produce the same percentage increases in air flow as the percentage increases in fuel delivered to the combustion chambers. Thus, above this certain load the air to fuel ratio becomes constant and neither the exhaust temperature nor the specific fuel consumption, rise with further increases in load over a considerable range. The engine on which the tests were carried out was designed for about one third of the output now obtained, and it is this feature which enables the new high output to be carried with substantially unchanged major components of the engine. The change in character of the unit means that the normal rating limits are no longer applicable, as there is no limiting exhaust temperature or exhaust state to determine the full load. The limit to the output of the unit could be the mechanical limitations of the engine or the turbine rotor speed.

If an engine is designed with adequate strength, so that the mechanical limitation is the turbine rotor speed, then for a constant turbine nozzle area the output of the unit would be limited, approximately, to a constant gas horsepower of the exhaust gases. If the engine is considered as a simple orifice in the system, this constant gas horsepower will be given by constant exhaust heat flow, which in turn will result from burning fuel at a constant rate in the engine regardless of its speed of rotation. The system of the invention will, therefore, give a near approach to the constant horsepower unit, and although this is the ideal case, it ensures that in practice a steeply rising torque curve is obtained with decreasing load, over at least the upper part of the speed range. Such a torque curve characteristic is very desirable for many applications of power units.

We claim:

1. A gas producing unit comprising at least one combustion chamber having at least one controlled exhaust orifice that opens and closes at predetermined points in the cycle of operations of the said unit and from which the gaseous products of combustion are discharged periodically at high temperature and under pressure, thus producing successive pulses of gases, a driven machine positioned close to the said at least one exhaust orifice, and an exhaust system, including a junction, a first duct made to the practical limit of shortness leading from said at least one exhaust orifice to said junction, where each pulse of gases originating at said at least one exhaust orifice is divided into primary and secondary partial pulses, a second duct made to the practical limit of shortness to provide a direct passageway from said junction to said driven machine, through which the primary partial pulses pass directly to the machine whereby to drive the machine by their expansion, and at least one wave pipe closed at the end remote from said junction and connected to said junction to provide an indirect passage way to the machine for said secondary partial pulses, the indirect passage way for said secondary partial pulses being so much longer than the direct passage way for said primary partial pulses that each said secondary partial pulse reaches said machine to aid in its operation after each associated primary partial pulse of gases, which travelled directly along said second duct, has substantially completed the expansion of its gases in driving the machine.

2. An exhaust system for a gas producing unit of the type comprising a plurality of combustion chambers, each having controlled exhaust orifices that open and close in sequence at predetermined points in the cycle of operation of the said unit, and from which the gaseous products of combustion are discharged periodically at high temperature and under pressure, thus producing successive pulses of gases, a driven machine positioned close to the said exhaust orifices, and an exhaust system, including a junction, a first duct made to the practical limit of shortness for connecting to said junction, the said exhaust orifices of the number of combustion chambers in which the periods that the exhaust orifices are open do not overlap substantially, and at said junction each said pulse of gases originating at said exhaust orifices is divided into primary and secondary partial pulses, a second duct made to the practical limit of shortness to provide a direct passage way from said junction to said machine, through which the primary partial pulses pass directly to the machine, and by their expansion drive the machine, and one wave pipe closed at the end remote from the junction and is connected to said junction to provide an indirect passage way to the said machine for the said secondary partial pulses originating at all of the plurality of combustion chambers, and the indirect passage way for said secondary partial pulses is so much longer than the direct passage way for said primary partial pulses along said second duct, that the machine is supplied with substantially separate primary and secondary partial pulses, and the frequency of the partial pulses is at least double the frequency of the pulses originating at the said exhaust orifices of the said combustion chambers, and their amplitude is reduced.

3. Unit as claimed in claim 1, in which the length of the wave pipe is such that the portion of the partial pulse reflected from the closed end of the wave pipe, which passes the entry to the second duct and proceeds back to the exhaust orifices of the combustion chamber, reaches the latter towards the end of its charging period.

References Cited in the file of this patent

UNITED STATES PATENTS 2,948,113    Miller  ----------------  Aug. 9, 1960